United States Patent [19]
Aigner et al.

[11] Patent Number: 5,900,209
[45] Date of Patent: May 4, 1999

[54] PLANT FOR PRODUCING METAL MELTS

[75] Inventors: Bernhard Aigner, Oftering; Harald Berger; Peter Mittag, both of Linz, all of Austria

[73] Assignee: Voest-Alpine Industrieanlagenbau GmbH, Linz, Austria

[21] Appl. No.: 08/849,989

[22] PCT Filed: Nov. 30, 1995

[86] PCT No.: PCT/AT95/00237

§ 371 Date: Jun. 2, 1997

§ 102(e) Date: Jun. 2, 1997

[87] PCT Pub. No.: WO96/17092

PCT Pub. Date: Jun. 6, 1996

[30] Foreign Application Priority Data

Dec. 2, 1994 [AT] Austria .................................. 2247/94

[51] Int. Cl.⁶ ....................................................... C21B 7/00
[52] U.S. Cl. ............................ 266/142; 373/108; 266/901
[58] Field of Search ............................... 373/108; 266/45, 266/99, 142, 901

[56] References Cited

U.S. PATENT DOCUMENTS 4,461,010  7/1984  Titus ........................................ 373/108
5,155,740  10/1992  Ao et al. ................................. 373/108

FOREIGN PATENT DOCUMENTS 396483  9/1993  Austria .
023058  1/1981  European Pat. Off. .
548041  6/1993  European Pat. Off. .
3541294  6/1986  Germany .

OTHER PUBLICATIONS

Stahl Und Eisen, vol. 114, No. 5, May 16, 1994, pp. 37–31, "Gegenuberstellung Von Gleichstrom–Und Drehstrom–Lichtbogenofen Comparison of Direct–Current and Three–Phase A.C. Arc Furnaces".

Steel Times—Incorporating Iron & Steel, Oct. 1, 1992 pp. S13–S14, Spatny W. et al, "Power Supplies for DC Furnaces".

H. Berger, "Die elektrische und mechanische Auslegung des Elektrolichtbogenofens", Radex Rundschau, Apr. 1982, Heft. ½.

G. Pfeiffer, "Elektrische Auslegung und Ausrustung von Lichtbogenofenanlagen", Sonderdruck Aus "Radex–Rundschau", Heft. Feb. 12, 1984.

The New Encyclopedia Britannica, vol. 21, pp. 433–434 No Date.

*Primary Examiner*—Scott Kastler
*Attorney, Agent, or Firm*—Ostrolenk, Faber, Gerb & Soffen, LLP

[57] ABSTRACT

A plant for producing metal includes a electricity supply system and a direct-current electric arc furnace connected thereto, where in order to make do with an electricity supply system possessing a relatively small short-circuit capacity, the direct-current electric arc furnace has at least two electrodes and the electricity supply system has a system short-circuit capacity $S_k$ which is at least equal to $$S_k \geq 40 \times 3 \sqrt{\sum_{i=1}^{n} S_i^3},$$

wherein $S_i$ is the nominal power per electrode and i represents an index for the electrodes that varies from 1 up to the maximum number of electrodes in the direct-current electric arc furnace.

5 Claims, No Drawings

PLANT FOR PRODUCING METAL MELTS

BACKGROUND OF THE INVENTION

1. Field of the Invention

The invention relates to a plant for producing metal melts, in particular steel melts from scrap, wherein the plant includes a direct-current electric arc furnace connected to a electricity supply system.

2. Related Art

The use of electric arc furnaces for producing metal melts, in particular for melting scrap, presupposes a electricity supply system of suitable strength, since during the operation of electric arc furnaces the load currents of an electric arc furnace may vary over a wide range, due to short-circuits caused, e.g. by falling-down scrap, sponge iron, etc. This entails effects on the electricity supply system, their most disagreeable manifestation being the so-called "flicker trouble". This phenomenon consists in changes in the luminous intensity of the lighting equipment powered by the electricity supply system of the electric arc furnace due to system voltage fluctuations (cf. Radex-Rundschau, issue ½, 1982, "Die elektrische und mechanische Auslegung des Elektrolichtbogenofens", ["Electrical and Mechanical Dimensioning of the Electric Arc Furnace", the paper includes a summary in English], pp. 724 through 756).

In order to avoid flickering it is known to raise the connection point of an electric arc furnace with a electricity supply system that also supplies the general public, the so-called PCC (Point of Common Coupling), to a higher voltage level—which is tantamount to a higher capacity level of the electricity supply system. Further it is known to provide for dynamic compensation in order to reduce effects on the electricity supply system with alternating-current and rotary-current electric arc furnaces (Radex-Rundschau, issue 2, 1984, "Elektrische Auslegung und Ausrüstung von Lichtbogenofenanlagen" ["Electrical lay-out and equipment of electric arc furnace installation", the paper includes a short introduction in English], pp. 360 through 378). In the event that the system short-circuit capacity required to avoid flickering is not available even if the PCC is provided at the highest voltage level of the electricity supply system, such a flicker compensating apparatus for balancing the rapidly fluctuating reactive power demand of electric arc furnaces is indispensable.

All of these considerations have, however, been aimed at rotary-current electric arc furnaces. With a direct-current electric arc furnace the effects on the electricity supply system are different from those regarding rotary-current electric arc furnaces, due to the direct-current engineering. With direct-current electric arc furnaces it is, for instance, feasible to reduce the fluctuation in reactive power, and thus the flicker-effects are considerably reduced. It is known to avoid flicker-effects with a direct-current electric arc furnace by ensuring that the system short-circuit capacity is at least half the system short-circuit capacity calculated for an alternating- or rotary-current electric arc furnace of the same nominal power. However, this still presupposes a relatively high system short-circuit capacity and may entail difficulties, particularly in such cases where a PCC of the required capacity level is not available. In this case the difficulties were coped with by expanding the electricity supply system through the addition of overhead lines or by means of dynamic compensation equipment, or else the furnace throughput was markedly reduced and the deferred operation of a plurality of electric arc furnaces considered. It must, however, be said that all of these options are structurally complicated and expensive.

SUMMARY OF THE INVENTION

The invention aims at avoiding these disadvantages and difficulties and has as its object to provide a plant for producing metal melts, wherein even a electricity supply system of relatively low short-circuit capacity may be employed, without employing a dynamic compensation equipment. The electricity supply system or the PCC and the direct-current electric arc furnace should be optimally adjusted to each other at the maximum possible furnace throughput.

According to the invention, this object is achieved by the following combination:
 a direct-current electric arc furnace having at least two electrodes and
 a electricity supply system whose system short-circuit capacity $S_k$ is at least equal to $$S_k \geq 40 \times 3 \sqrt{\sum_{i=1}^{n} S_i^3},$$

wherein $S_i$ is the nominal power per electrode and i represents an index for the electrodes that varies from 1 up to the maximum number of electrodes in the direct-current electric arc furnace. A direct-current electric arc furnace having several electrodes is known from AT-3-396.483.

DETAILED DESCRIPTION OF THE INVENTION

The invention is based on the conclusion that with a direct-current electric arc furnace that has at least two electrodes the flicker trouble differs markedly from that of a direct-current electric arc furnace having only one single electrode; it is feasible to significantly increase the furnace throughput without causing any flickering, or the number of direct-current electric arc furnaces can be reduced. This is because each of the electric arcs of a direct-current electric arc furnace including several electrodes carries only part of the overall current and because, as has been shown in the course of extensive research activities, all electrodes are never affected by short-circuits simultaneously.

When faced with particularly unfavourable operating conditions of a direct-current electric arc furnace it is advisable to dimension the system short-circuit capacity so as to be at least equal to $$S_k \geq 40 \times 2 \sqrt{\sum_{i=1}^{n} S_i^2}.$$

Preferably, the system short-circuit capacity is less than half the minimum system short-circuit capacity calculated for a rotary- or alternating-current electric arc furnace of the same nominal power.

The following description will provide a more detailed disclosure of the invention:

According to the prior art (Radex-Rundschau, issue ½, 1982, "Die elektrische und mechanische Auslegung des Elektrolichtbogenofens", pp. 724 through 756) a rotary-current electric arc furnace with a nominal power of 160 MVA requires a supply system having a system short-circuit capacity $S_k$ of 12,800 MVA, which is calculated as follows:

$$S_k \geq k_{AC} \times S_N.$$

Key to the symbols used above:
 $k_{AC}$=factor for alternating- or rotary-current electric arc furnaces=80

$S_N$=nominal power of the rotary-current electric arc furnace

If instead of the rotary-current electric arc furnace a direct-current electric arc furnace of equal nominal power and having a centrally disposed electrode is provided, then a minimum system short-circuit capacity $S_k$ of 6,400 MVA results for a direct-current electric arc furnace of this type. This system short-circuit capacity is calculated as follows:

$$S_k \geq k_{DC} \times S_N$$

$k_{DC}$: =factor for direct-current electric arc furnaces=½× $k_{AC}$=40

$S_N$=nominal power of the direct-current electric arc furnace

According to the invention a direct-current electric arc furnace of equal nominal power and having four electrodes is employed and a flicker-free electricity supply system is ensured, with the minimum system short-circuit capacity lying at 3,200 MVA. This minimum system short-circuit capacity $S_k$ is calculated as follows:

$$S_k \geq k_{DC} \times \sqrt[2]{\sum_{i=1}^{4} S_i^2} = 40 \times \sqrt[2]{40 \times 40^2} = 3,200$$

Thus, two facts emerge according to the invention: firstly, with a electricity supply system that does not have a very high system short-circuit capacity, suitably a direct-current electric arc furnace having several electrodes is provided, and secondly, with a direct-current electric arc furnace that has a plurality of electrodes it suffices to install a electricity supply system having only a low system short-circuit capacity or to fix the PCC at a relatively low voltage level of the electricity supply system. This can be of particular importance in all areas where the electricity supply system are relatively weak. Furthermore, the invention recommends itself wherever the utility companies allow only uncommonly low interference levels.

We claim:

1. A plant for producing metal melts from scrap, wherein said plant includes a direct-current electric arc furnace connected to a electricity supply system, the plant comprising:

a direct-current electric arc furnace having at least two electrodes and an electricity supply system whose system short-circuit capacity $S_k$ is at least equal to $$S_k \geq 40 \times 3\sqrt{\sum_{i=1}^{n} S_i^3},$$

wherein $S_i$ is the nominal power per electrode available from the electricity supply system and i represents an index for the electrodes that varies from 1 up to the maximum number of electrodes in the direct-current electric arc furnace.

2. A plant according to claim 1, characterised in that the system short-circuit capacity $S_k$ is at least equal to $$S_k \geq 40 \times \sqrt[2]{\sum_{i=1}^{n} S_i^2}.$$

3. A plant according to claim 1, wherein the system short-circuit capacity is less than half the minimum system short-circuit capacity calculated for a rotating- or alternating-current electric arc furnace of the same nominal power.

4. A plant according to claim 2, wherein the system short-circuit capacity is less than half the minimum system short-circuit capacity calculated for a rotating- or alternating-current electric arc furnace of the same nominal power.

5. A plant for producing metal melts, comprising:

a direct-current electric arc furnace having at least two electrodes; and an electricity supply system coupled to the furnace and having a minimum system short-circuit capacity $S_k$ of about:

$$S_k = 40 \times \sqrt[3]{\sum_{i=1}^{n} S_i^3},$$

wherein $S_i$ is the nominal power per cathodic electrode available from the electricity supply system and i is the number of electrodes.

\* \* \* \* \*